United States Patent

Shaw

[11] Patent Number: 5,880,253
[45] Date of Patent: Mar. 9, 1999

[54] PRODUCTION OF ORGANOSULFUR OR ORGANOSELENIUM PLOYMERS

[75] Inventor: James E. Shaw, Bartlesville, Okla.

[73] Assignee: Phillips Petroleum Company, Bartlesville, Okla.

[21] Appl. No.: 823,769

[22] Filed: Mar. 24, 1997

[51] Int. Cl.$^6$ .................................................... C08G 75/14
[52] U.S. Cl. ........................ 528/388; 528/397; 528/422
[58] Field of Search ..................................... 528/388, 397, 528/422

[56] References Cited

U.S. PATENT DOCUMENTS

| | | | |
|---|---|---|---|
| 2,906,739 | 9/1959 | Bruckner et al. | 528/388 |
| 3,356,656 | 12/1967 | Remes et al. | 528/388 |

OTHER PUBLICATIONS

CA 65; 9026d (1966).
CA 65: 17058d (1966).
CA 69: 28107p (1968).
CA 71: 81885h (1969).
CA 93: 205119n (1980).
CA 95: 204702b (1981).
CA 97: 162286c (1982).
CA 97: 198607x (1982).

Primary Examiner—Frederick Krass
Attorney, Agent, or Firm—Lucas K. Shay

[57] ABSTRACT

A process for producing a polymer is provided which can comprise, consist essentially of, or consists of, contacting an inorganic compound having the formula of $M_xH_yZ_p$, in an aqueous medium, with an organic halide under a condition sufficient to effect the production of the polymer in which the polymer comprises repeat units having the formula of $(C_mH_{2m-q}(R'_q)-Z_p)_n$ in which m is a whole number from 1 to about 20; Z can be S, Se, or combinations thereof; n is a number from about 5 to about 400; M is a metal or ammonium ion; x is a number filling the necessary valency of M; y is 0 or 1; q is a whole number from 0 to about 10 and p is a whole number from 1 to 4.

22 Claims, No Drawings

PRODUCTION OF ORGANOSULFUR OR ORGANOSELENIUM PLOYMERS

FIELD OF THE INVENTION

The present invention relates to a process for producing an organosulfur or organoselenium polymer.

BACKGROUND OF THE INVENTION

An organosulfur or organoselenium polymer can be used in a variety of applications. For example, an organosulfur polymer such as a solid poly(methylene sulfide) having a melting point of about 180° C. or higher can be used in the synthesis of chloromethanesulfonyl chloride. Poly (methylene sulfide), also called polymethanethial, poly (thiomethylene), or polythioformaldehyde, can react with chlorine to produce a sulfonyl chloride which can be used in agriculture chemicals, herbicides, insecticides, or pharmaceuticals.

Poly(methylene sulfide) can be produced by bubbling hydrogen sulfide through aqueous formaldehyde at 20° C. using $H_2SO_4$ as catalyst. The polymer can also be produced by reacting methylene chloride with alkali metal sulfide in the presence of methyltrioctylammonium chloride. Although it has been shown that the polymer can be produced by reacting sodium hydrosulfide in ethanol solvent with methylene chloride, it has to be carried out in an anhydrous medium. Addition of water to the solvent (20% water) results in a weight ratio of methylene sulfide trimer to methylene sulfide polymer as high as 3:2.

Therefore, development of an economical and simple process for producing an organosulfur or organoselenium polymer would be a significant contribution to the art.

SUMMARY OF THE INVENTION

An object of the invention is to provide a process for producing a polymer having repeat units comprising an organosulfur or organoselenium. Another object of the invention is to provide a process for producing an organosulfur or organoselenium polymer in an aqueous medium. An advantage of the invention is that a high melting point organosulfur polymer can be produced in an aqueous medium. Another advantage of the invention is that the invention process produces a finely divided polymer which is easier to handle, to process, such as to filter, and to dry. Other objects and advantages will become more apparent as the invention is more fully disclosed hereinbelow.

According to the process of the invention, a process for producing a polymer is provided which can comprise, consist essentially of, or consist of, contacting an inorganic compound having the formula of $M_xH_yZ_p$, in an aqueous medium, with an organic halide under a condition sufficient to effect the production of the polymer in which the polymer comprises repeat units having the formula of $(C_mH_{2m-q}(R'_q)-Z_p)_n$ in which m is a whole number from 1 to about 20; R' is a substituted or nonsubstituted hydrocarbyl radical; q is 0 to about 10; Z can be S, Se, or combinations thereof; n is a number from about 5 to about 400; M is a metal or ammonium ion; x is a number filling the necessary valency of M; y is 0 or 1; and p is 1 to 4.

DETAILED DESCRIPTION OF THE INVENTION

According to the invention, the polymer has the formula of $R-Z-(C_mH_{2m-q}(R'_q)-Z_p)_n-R$ in which R can be hydrogen, $X-C_mH_{2m-q}(R'_q)$, an alkali metal, or combinations of two or more thereof; R' is a substituted or nonsubstituted hydrocarbyl radical having 1 to about 20, preferably 1 to about 15, and most preferably 1 to 10 carbon atoms per radical which can be selected from alkyl radicals, aryl radicals, alkyl aryl radicals, aryl alkyl radicals, and combinations of two or more thereof; X is a halogen; m is a whole number from 1 to about 20, preferably 1 to about 15, and most preferably 1 to 10; Z is S, Se, or combinations thereof; q is a whole number of 0 to about 10, preferably 0 to about 5, more preferably 0 to 2, even more preferably 0 or 1, and most preferably 0; and n is a number from about 5 to about 400, preferably about 5 to about 300, more preferably about 10 to about 200, and most preferably about 10 to about 100. Examples of such polymer include, but are not limited to, poly(methylene sulfide), poly(ethylene sulfide), poly (propylene sulfide), poly(butylene sulfide), poly(pentylene sulfide), poly(hexylene sulfide), poly(octylene sulfide), poly (methylmethylene sulfide), poly(methylethylene sulfide), poly(phenylmethylene sulfide), poly(phenylethylene sulfide), poly(methylene selenide), poly(ethylene selenide), poly(propylene selenide), poly(methylene disulfide), poly (ethylene disulfide), poly(methylene trisulfide), poly (ethylene trisulfide), poly(methylene tetrasulfide), poly (ethylene tetrasulfide), poly(butylene selenide), poly (pentylene selenide), poly(hexylene selenide), poly(octylene selenide), poly(methylmethylene selenide), poly (methylethylene selenide), poly(phenylmethylene selenide), poly(phenylethylene selenide), poly(butylene diselenide), poly(pentylene diselenide), poly(butylene triselenide), poly (pentylene triselenide), and combinations of two or more thereof.

Any inorganic compound having the formula of $M_xH_yZ_p$ which can be substantially dissolved in an aqueous medium and can react with an organic halide to produce a polymer having a melting point of at least about 120° C., preferably about 150° C., more preferably about 180° C., even more preferably about 190° C., and most preferably about 195° C., can be employed in the process of the invention wherein M is a metal or ammonium ion, x is a number filling the necessary valency of M; p is an integer of 1 to 4, preferably 1 to 3, and most preferably 1 or 2; y is 0 or 1; and Z is the same as that described above. The term "substantially" denotes "more than trivial" and can be "nearly entirely". The metal ion can be an alkali metal ion, and alkaline earth metal ion, or combinations of two or more thereof. Examples of suitable inorganic compounds include, but are not limited to lithium sulfide, lithium hydrosulfide, sodium sulfide, sodium disulfide, sodium trisulfide, sodium tetrasulfide, sodium hydrosulfide, potassium sulfide, potassium disulfide, potassium trisulfide, potassium tetrasulfide, potassium hydrosulfide, lithium selenide, lithium hydroselenide, sodium selenide, sodium hydroselenide, potassium selenide, potassium hydroselenide, ammonium sulfide, ammonium hydrosulfide, ammonium selenide, ammonium hydroselenide, and combinations of any two or more thereof. The presently preferred inorganic compounds are sodium sulfide or sodium hydrosulfide because they are readily available. The inorganic compound can also be produced in-situ in a reaction medium by combining hydrogen sulfide and a metal hydroxide sulfide such as, for example, sodium hydroxide.

The process of the invention is carried out in an aqueous medium. The term "aqueous medium" refers to water, a solution, a suspension which can contain some insoluble substance in the range of from about 0.001 to about 30 weight %, or combinations of two or more thereof. The aqueous medium or solution can also comprise water-soluble organic solvent in the range of from about 0.001 to about 90 weight %.

Any organic halide that is substantially soluble in an aqueous medium and can react with an inorganic sulfide or selenide compound disclosed above can be used in the process of the invention. The presently preferred organic halide has the formula of $X\text{-}(C_mH_{2m-q}(R'_q))\text{-}X$ in which each X can be the same or different and is independently a halogen and m, R', and q are the same as those disclosed above. The presently preferred halide is chloride. Examples of suitable organic halides include, but are not limited to, dichloromethane, dichloroethane, dichloropropane, dichlorobutane, dichloropentane, dichlorohexane, dichlorooctane, dichlorodecane, 1,1-dichloroethane, 1,1-dichloropropane, benzol dichloride, β,β-dichloroethylbenzene, and combinations of two or more thereof. The presently most preferred organic halide is dichloromethane for the products produced therefrom can be used as intermediate for producing other chemicals.

According to the invention, the process of the invention is preferably carried out in the presence of an effective amount of a polyhydric alcohol. Any polyhydric alcohol having two or more hydroxyl groups that is substantially soluble in an aqueous medium and can increase the reaction rate of an inorganic sulfide or selenide compound with an organic halide to produce a poly(alkylene sulfide) or a poly(alkylene selenide) can be employed in the process of the invention. The preferred polyhydric alcohols are derivatives, or made from, ethylene oxide or propylene oxide. Generally, a suitable polyhydric alcohol has the formula of $H\text{-}(OC_mH_{2m-q}(R'_q))_z\text{-}OH$ in which m, R', and q are the same as those disclosed above and z is a whole number from 1 to about 400, preferably 1 to about 100, and most preferably about 1 to 10. Specific examples of suitable polyhydric alcohols include, but are not limited to, trimethylene glycol, triethylene glycol, glycerols, ethylene glycol, diethylene glycol, 1,2-propane diol, 1,3-propane diol, tripropylene glycol, polyethylene glycols, polypropylene glycols, and combinations of two or more thereof. The presently preferred polyhydric alcohol is triethylene glycol for it is readily available and inexpensive.

The inorganic compound and organic halide can be introduced into a suitable reaction vessel or reactor such as, for example, glassware or an autoclave. Because a reaction vessel is well known to one skilled in the art, the description of which is omitted herein for the interest of brevity. The molar ratio of the inorganic compound to organic halide can be any ratio so long as the ratio can effect the production of an organosulfur or organoselenium polymer disclosed above. The molar ratio of the inorganic compound to organic halide can generally be in the range of from about 0.1:1 to about 10:1, preferably about 0.9:1 to about 2:1, and most preferably about 1:1 of sulfur to a dihalide. The amount of polyhydric alcohol required, as disclosed above, is an amount that can effect the reaction rate for an inorganic compound and organic halide. The weight ratio of the polyhydric alcohol to the organic halide can generally be in the range of from about 0.001:1 to about 100: 1, preferably about 0.01:1 to about 30:1, and most preferably 0.1:1 to 10:1. The quantity of aqueous medium required can be any quantity so long as the quantity can substantially dissolve the inorganic compound and polyhydric alcohol.

The process of the invention can be carried out under a condition that is sufficient to effect the production of a an organosulfur or organoselenium polymer. Generally the condition can include a temperature in the range of from about 0° C. to about 200° C., preferably about 10° C. to about 150° C., and most preferably 20° C. to 100° C.; a pressure that can accommodate or maintain the above-disclosed temperature, generally in the range of from about 1 atmosphere to about 35 atmospheres; and a time period sufficient to effect the production of an organosulfur or organoselenium polymer, generally in the range of from about 1 hour to about 30 hours.

The product produced by the process of the invention can be recovered by any means known to one skilled in the art such as, for example, centrifugation, filtration, decantation, or combinations of two or more thereof. The recovered product can be further washed with, for example, water or any suitable aqueous medium.

The following examples are provided to further illustrate the process of the invention and are not intended to be construed as to limit the scope of the invention.

EXAMPLE I

This examples illustrates the process of the invention.

To a 500 ml, 3-necked flask equipped with thermowell, large magnetic stir bar, pressure equalizing addition funnel, and condenser with $N_2$ bubbler on top was added in this order, 80 g of water, 84 g of triethylene glycol, 43.5 g of 45% NaSH, and 28 g of 50% NaOH. After mixing, the mixture was heated to 40° C. Then by the pressure equalizing addition funnel, 29.8 g of dichloromethane was added over 15 minutes at 40° C. with stirring (was not exothermic). The reaction mixture was then heated at 40° C. for 8 hours with stirring (a white precipitate started forming after about 3 hours). After 8 hours at 40° C., the reaction mixture was stirred at room temperature overnight. Then 100 mls of water was added. After stirring a few minutes, the mixture containing finely divided solids was suction filtered through a Buchner funnel. The solid in the funnel was washed with more water (about 200 mls). The white solid was transferred to a tared flask and dried with a slow $N_2$ stream at room temperature for 2 days. The final product was 11.4 g (70.5% yield) of a dry white powder with a melting point of 205°–210° C. Drying longer did not reduce the weight. Combustion element analysis gave these results: 26.39% carbon, 4.46% hydrogen, 69.77% sulfur. These are in good agreement with theoretical values for —$(CH_2S)_n$— which are 26.06% carbon, 4.37% hydrogen, and 69.57% sulfur.

EXAMPLE II

This is another example illustrating the process of the invention carried out in a larger scale that is illustrated in Example I.

To a 5 liter, 3-necked flask equipped with thermowell, large magnetic stirring bar, pressure equalizing addition funnel, and condenser with $N_2$ inlet on top was added 900 g of water, 335 g of 58.5% NaSH, 840 g of triethylene glycol, and 280 g of 50% NaOH. The solution was heated to 40° C. By the addition funnel was added 298 g of methylene chloride over 30 minutes with stirring. The reaction temperature did not change from 40° C. initially. After 2–3 hours the reaction mixture started getting cloudy and gradually turned milky due to a fine white or greenish-white precipitate. The reaction temperature also increased from 40° to 45° C. without external heating. After 8 hours the reaction mixture had thickened considerably from the finely divided precipitate which had formed. The mixture was allowed to stir overnight without external heating. Then 600 mls of water was added and the mixture stirred 15 minutes. The mixture was then suction filtered using a large Buchner funnel. The precipitate in the funnel was washed with 1400 mls water. The precipitate was transferred to a large tared beaker and was dried at room temperature using a $N_2$ stream for several days. When constant weight was achieved, drying was stopped. The weight of fine white or greenish-white solid was 131, 130.5, and 128 g in 3 different runs. These weights represent 81.2, 80.9, and 79.3 mole % yields, respectively of poly(methylene sulfide). The melting point was 197°–203° C.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting an inorganic compound having the formula of $M_xH_yZ_p$, in an aqueous medium which comprises a polyhydric alcohol in an amount sufficient to increase the reaction rate between said inorganic compound and an organic halide, with an organic halide under conditions sufficient to effect the production of a polymer which comprises repeat units having the formula of $(C_mH_{2m-q}(R'_q)-Z_p)_n$ wherein M is a metal or ammonium ion; x is a number filling the necessary valency of M; y is 0 or 1; m is a whole number from 1 to about 20; R' is a hydrocarbyl radical having 1 to about 20 carbon atoms per radical; q is a whole number from 0 to 10; Z is selected from the group consisting of S, Se, and combinations thereof; n is a number from about 5 to about 400; and p is an integer of 1 to 4.

2. A process according to claim 1 wherein m is from 1 to 10.

3. A process according to claim 1 wherein n is from about 10 to about 100.

4. A process according to claim 1 wherein M is an alkali metal.

5. A process according to claim 1 wherein Z is S.

6. A process according to claim 1 wherein m is from 1 to 10, n is from about 10 to about 100, M is an alkali metal, and Z is S.

7. A process according to claim 1 wherein said polymer is selected from the group consisting of poly(methylene sulfide), poly(ethylene sulfide), poly(propylene sulfide), poly(butylene sulfide), poly(pentylene sulfide), poly(hexylene sulfide), poly(octylene sulfide), poly(methylmethylene sulfide), poly(methylethylene sulfide), poly(phenylmethylene sulfide), poly(phenylethylene sulfide), poly(methylene disulfide), poly(ethylene disulfide), poly(methylene trisulfide), poly(ethylene trisulfide), poly(methylene tetrasulfide), poly(ethylene tetrasulfide), poly(methylene selenide), poly(ethylene selenide), poly(propylene selenide), poly(butylene selenide), poly(pentylene selenide), poly(hexylene selenide), poly(octylene selenide), poly(methylmethylene selenide), poly(methylethylene selenide), poly(phenylmethylene selenide), poly(phenylethylene selenide), poly(butylene diselenide), poly(pentylene diselenide), poly(butylene triselenide), poly(pentylene triselenide), and combinations of two or more thereof.

8. A process according to claim 1 wherein said polymer is poly(methylene sulfide).

9. A process according to claim 1 wherein said inorganic compound is selected from the group consisting of lithium sulfide, lithium hydrosulfide, sodium sulfide, sodium disulfide, sodium trisulfide, sodium tetrasulfide, sodium hydrosulfide, potassium sulfide, potassium disulfide, potassium trisulfide, potassium tetrasulfide, potassium hydrosulfide, lithium selenide, lithium hydroselenide, sodium selenide, sodium hydroselenide, potassium selenide, potassium hydroselenide, ammonium sulfide, ammonium hydrosulfide, ammonium selenide, ammonium hydroselenide, and combinations of any two or more thereof.

10. A process according to claim 1 wherein said inorganic compound is sodium sulfide.

11. A process according to claim 1 wherein said inorganic compound is sodium hydrosulfide which is used in combination with sodium hydroxide.

12. A process according to claim 1 wherein said polyhydric alcohol is selected from the group consisting of trimethylene glycol, triethylene glycol, glycerols, ethylene glycol, diethylene glycol, 1,2-propane diol, 1,3-propane diol, tripropylene glycol, polyethylene glycols, polypropylene glycols, and combinations of two or more thereof.

13. A process according to claim 1 wherein said polyhydric alcohol is triethylene glycol.

14. A process according to claim 1 wherein said organic halide has the formula of $X-(C_mH_{2m-q}(R'_q))-X$ wherein each X is independently a halogen, m is a whole number from 1 to about 20, q is 0 to 1, and R' is a hydrocarbyl radical having 1 to about 20 carbon atoms per radical.

15. A process according to claim 14 wherein said organic halide is selected from the group consisting of dichloromethane, dichloroethane, dichloropropane, dichlorobutane, dichloropentane, dichlorohexane, dichlorooctane, dichlorodecane, 1,1-dichloroethane, 1,1-dichloropropane, benzol dichloride, β,β-dichloroethylbenzene, and combinations of two or more thereof.

16. A process according to claim 14 wherein said organic halide is dichloromethane.

17. A process comprising contacting an inorganic compound having the formula of $M_xH_yZ_p$, in an aqueous medium, with an organic halide under conditions sufficient to effect the production of a polymer which comprises repeat units having the formula of $(C_mH_{2m-q}(R'_q)-Z_p)_n$ wherein m is a whole number from 1 to about 20;

said organic halide has the formula of $X-(C_mH_{2m-q}(R'_q))-X$ wherein each X is independently a halogen;

R' is a hydrocarbyl radical having 1 to about 20 carbon atoms per radical;

q is a number from 0 to 10;

Z is selected from the group consisting of S, Se, and combinations thereof;

n is a number from about 5 to about 400;

M is a metal or ammonium ion;

x is a number filling the necessary valency of M;

y is 0 or 1;

p is 1 to 4; and said aqueous medium comprises a polyhydric alcohol in an amount sufficient to increase the reaction rate between said inorganic compound and said organic halide.

18. A process according to claim 17 wherein said polymer is selected from the group consisting of poly(methylene sulfide), poly(ethylene sulfide), poly(propylene sulfide), poly(butylene sulfide), poly(pentylene sulfide), poly(hexylene sulfide), poly(octylene sulfide), poly(methylmethylene sulfide), poly(methylethylene sulfide), poly(phenylmethylene sulfide), poly(phenylethylene sulfide), poly(methylene disulfide), poly(ethylene disulfide), poly(methylene trisulfide), poly(ethylene trisulfide), poly(methylene tetrasulfide), poly(ethylene tetrasulfide), poly(methylene selenide), poly(ethylene selenide), poly(propylene selenide), poly(butylene selenide), poly(pentylene selenide), poly(hexylene selenide), poly(octylene selenide), poly(methylmethylene selenide), poly(methylethylene selenide), poly(phenylmethylene selenide), poly(phenylethylene selenide), poly(butylene diselenide), poly(pentylene diselenide), poly(butylene triselenide), poly(pentylene triselenide), and combinations of two or more thereof;

said inorganic compound is selected from the group consisting of lithium sulfide, lithium hydrosulfide, sodium sulfide, sodium trisulfide, sodium trisulfide, sodium tetrasulfide, sodium hydrosulfide, potassium sulfide, potassium disulfide, potassium trisulfide, potassium tetrasulfide, potassium hydrosulfide, lithium selenide, lithium hydroselenide, sodium selenide, sodium hydroselenide, potassium selenide, potassium hydroselenide, ammonium sulfide, ammonium hydrosulfide, ammonium selenide, ammonium hydroselenide, and combinations of any two or more thereof;

said polyhydric alcohol is selected from the group consisting of trimethylene glycol, triethylene glycol, glycerols, ethylene glycol, diethylene glycol, 1,2-propane diol, 1,3-propane diol, tripropylene glycol, polyethylene glycols, polypropylene glycols, and combinations of two or more thereof; and said organic halide is selected from the group consisting of dichloromethane, dichloroethane, dichloropropane, dichlorobutane, dichloropentane, dichlorohexane, dichlorooctane, dichlorodecane, 1,1-dichloroethane, 1,1-dichloropropane, benzol dichloride, β,β-dichloroethylbenzene, and combinations of two or more thereof.

19. A process according to claim 17 wherein said polymer is poly(methylene sulfide); said inorganic compound is sodium sulfide; said polyhydric alcohol is triethylene glycol; and said organic halide is dichloromethane.

20. A process for producing poly(methylene sulfide) which comprises contacting, in an aqueous medium comprising triethylene glycol in an amount sufficient to increase the reaction rate between sodium sulfide and dichloromethane, sodium sulfide with dichloromethane under conditions sufficient to effect to production of said poly(methylene sulfide).

21. A process according to claim 1 wherein p is an integer of 1 to 3.

22. A process according to claim 1 wherein p is an integer of 1 or 2.

* * * * *